US008562397B1

(12) United States Patent
Palmateer et al.

(10) Patent No.: US 8,562,397 B1
(45) Date of Patent: Oct. 22, 2013

(54) POULTRY SHACKLE REDIRECTING APPARATUS AND METHOD FOR DIRECTING POULTRY SHACKLES FROM A POULTRY PROCESSING LINE TO A DISPOSAL LINE

(71) Applicant: Perdue Foods Products, Salisbury, MD (US)

(72) Inventors: Scot Palmateer, Hebron, MD (US); Randy Richardson, Pittsville, MD (US); Dave Roberts, Salisbury, MD (US)

(73) Assignee: Perdue Foods Products, Salisbury, MD (US)

( * ) Notice: Subject to any disclaimer, the term of this patent is extended or adjusted under 35 U.S.C. 154(b) by 0 days.

(21) Appl. No.: 13/673,333

(22) Filed: Nov. 9, 2012

(51) Int. Cl.
*A22C 17/00* (2006.01)
(52) U.S. Cl.
USPC ........................................ 452/183
(58) Field of Classification Search
USPC ......... 452/157, 158, 177, 179, 180, 182, 183; 198/465.4, 680
See application file for complete search history.

(56) References Cited

U.S. PATENT DOCUMENTS

| | | | | |
|---|---|---|---|---|
| 4,689,855 A * | 9/1987 | Dameron | | 452/177 |
| 5,453,045 A * | 9/1995 | Hobbel et al. | | 452/182 |
| 5,460,567 A | 10/1995 | Tieleman et al. | | |
| 6,196,912 B1 * | 3/2001 | Lawler et al. | | 452/173 |
| 6,450,872 B1 | 9/2002 | Haley et al. | | |
| 6,749,497 B2 | 6/2004 | Haley et al. | | |
| 7,378,642 B2 | 5/2008 | Jones | | |
| 7,573,018 B2 | 8/2009 | Jones | | |
| 7,766,730 B2 * | 8/2010 | Vote et al. | | 452/184 |
| 7,837,539 B2 * | 11/2010 | Knopik et al. | | 452/150 |
| 8,079,897 B2 * | 12/2011 | Knopik et al. | | 452/150 |
| 8,187,062 B2 * | 5/2012 | Criscione et al. | | 452/188 |
| 8,246,429 B2 * | 8/2012 | Hilgren et al. | | 452/173 |

* cited by examiner

*Primary Examiner* — Richard Price, Jr.
(74) *Attorney, Agent, or Firm* — Venable LLP; Steven J. Schwarz

(57) ABSTRACT

A poultry shackle redirecting apparatus can include a conveyor that conveys a plurality of poultry shackles and a guide bar having an entrance positioned along the conveyor. The guide bar can be adapted to redirect a shackle from a poultry processing line to a disposal line. A detection device can be positioned at a distance upstream of the entrance to identify a shackle to be removed. An encoder can be positioned between the detection device and the entrance. The encoder can track a position of the shackle to be removed along the conveyor. Upon receiving instructions from the encoder that the shackle to be removed is positioned in registry with the entrance, a pushing device can be adapted to push the shackle to be removed into the entrance of the guide bar. A method of directing poultry shackles from a poultry processing line to a disposal is also disclosed.

27 Claims, 10 Drawing Sheets

POULTRY SHACKLE REDIRECTING APPARATUS AND METHOD FOR DIRECTING POULTRY SHACKLES FROM A POULTRY PROCESSING LINE TO A DISPOSAL LINE

TECHNICAL FIELD

This patent application relates generally to poultry processing, such as chickens and turkeys. More specifically, the present application relates to a poultry shackle redirecting apparatus and related methods for directing poultry shackles from a poultry processing line to a disposal line.

BACKGROUND

A particular consideration of the poultry processing industry is to prevent poultry products from a condemned bird from being entered into the saleable product stream. In the poultry paw processing sector, this consideration is even more important due to current inconsistent and random control processes of the poultry paws during some known conveying, unloading, and cutting processes. Due to these known control problems, the U.S. Department of Agriculture (USDA) currently requires that the industry throw away seven sets of poultry paws (i.e. 14 poultry paws) for each condemned bird. Specifically, the industry must discard the paw set from the actual condemned bird, as well as three neighboring paw sets on each side of the conveying line, to compensate for the high margin of error.

As a result, there is a need in the poultry industry to more precisely and efficiently direct a shackle containing a poultry paw, or other poultry product, from an identified condemned bird from the poultry production line to a disposal line. Additionally or alternatively, there is a need to accurately control the location of each individual poultry paw and set of poultry paws up to the point of cutting and/or disposal.

SUMMARY

According to an embodiment, a poultry shackle redirecting apparatus may include a conveyor that conveys a plurality of poultry shackles and a guide bar having an entrance positioned along the conveyor. The guide bar may be adapted to redirect a shackle from a processing line to a disposal line. A detection device may be positioned at a distance upstream of the entrance to identify a shackle to be removed. An encoder may be positioned between the detection device and the entrance. The encoder may move in coordination with the movement of the conveyor, and may track a position of the shackle to be removed along the conveyor. A pushing device may be positioned along the conveyor and in proximity with the entrance. Upon receiving instructions from the encoder that the shackle to be removed is positioned in registry with to the entrance, the pushing device may be adapted to push the shackle to be removed into the entrance of the guide bar.

According to another embodiment, the pushing device may comprise a cam, and a servomotor adapted to rotate the cam about an axis of rotation. The cam may be adapted to rotate and push the shackle to be removed at an increasing pressure angle toward the entrance as the conveyor passes the axis of rotation of the cam. The encoder may be electrically connected to the servomotor and may be adapted to automatically align the cam with the location of the shackle to be removed on the conveyor.

According to a further embodiment, the poultry shackle redirecting apparatus may include a biased guide rod that may engage the shackle to be removed to tension the shackle against the cam while being pushed through the entrance of the guide bar. The guide rod may comprise a substantially vertical element, a substantially horizontal bar element, a pivot and an elastic member. The pivot may be rotatably coupled to the substantially vertical element, the guide bar may be fixed to the pivot, the substantially horizontal bar element may be fixed to the substantially vertical element, and the elastic member may connect the free ends of the guide bar and the substantially horizontal bar element.

According to an embodiment, the biased guide rod may be moveable between a position that allows the shackle to move through the entrance from the processing line to the disposal line, and a position that prevents the shackle from moving through the entrance from the disposal line to the processing line. The disposal line may be a guidebar that may feed into a backup unloader. And, the biased guide rod may release the shackle to be removed once the shackle is secured on the guidebar.

According to another embodiment, the detection device may be a photodetector that may be adapted to count the number of shackles moving along the conveyor. The photodetector may be adapted to identify a shackle to be removed based on the numerical order of the shackle along the conveyor. The photodetector may relay the position of each shackle to be removed to the encoder.

According to an embodiment, the detection device may be a plurality of photoeyes positioned at different locations upstream of the entrance on the conveyor. The plurality of photoeyes may be adapted to track the position of a shackle to be removed based on the numerical order of the shackle along the conveyor.

According to another embodiment, the distance between the detection device and the entrance may be equivalent to a pre-determined number of rotations of the encoder. The encoder may be adapted to track a position of the shackle to be removed regardless of whether the conveyor is conveying the shackle in a forward or backward direction.

According to an embodiment, the pushing device may be positioned directly upstream of a poultry paw cutting apparatus.

According to another embodiment, a method for directing poultry shackles from a poultry processing line to a disposal line may include identifying, using a detection device, a shackle to be removed from a plurality of shackles conveyed along a conveyor. The method may include tracking movement of the shackle to be removed away from the detection device and towards an entrance of a guide bar using an encoder that is moved in coordination with the movement of the conveyor. The method may include pushing the shackle to be removed away from the conveyor and through the entrance of the guide bar, and separately conveying the shackle to be removed along the disposal line to a downstream disposal location.

BRIEF DESCRIPTION OF THE DRAWINGS

The foregoing and other features and advantages will be apparent from the following, more particular, description of various exemplary embodiments, as illustrated in the accompanying drawings, wherein like reference numbers generally indicate identical, functionally similar, and/or structurally similar elements.

DETAILED DESCRIPTION

Various embodiments of the invention are discussed in detail below. While specific embodiments are discussed, it should be understood that this is done for illustration purposes only. A person skilled in the relevant art will recognize that other components and configurations can be used without departing from the spirit and scope of the invention.

Figure 1:
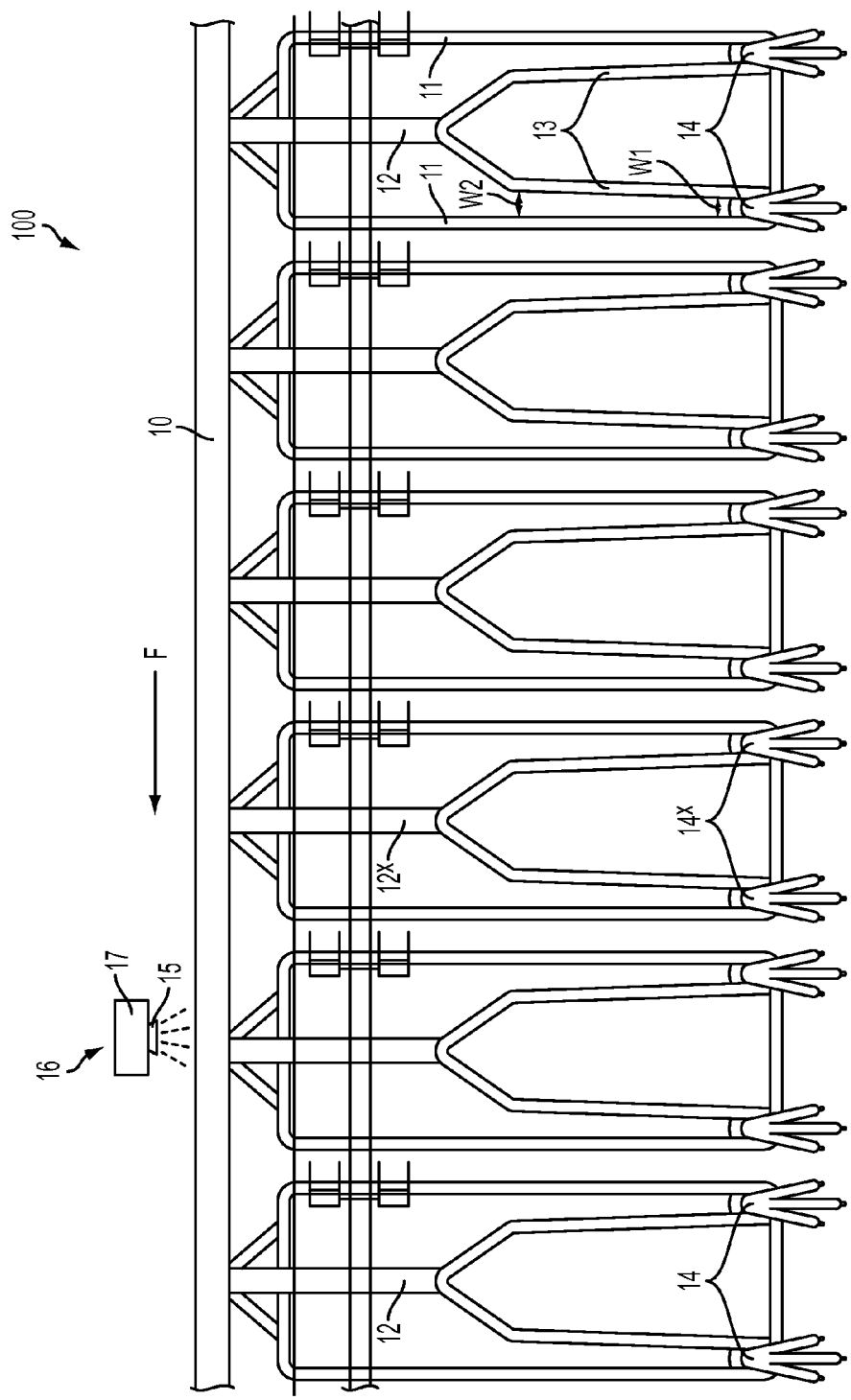
FIG. 1 depicts a front view of a poultry processing line, according to an embodiment of the present invention.

FIG. 1 depicts a front view of a poultry processing line 100. A conveyor 10 may convey a plurality of poultry shackles 12 forward in a conveying direction F and/or backward in a direction opposite to the conveying direction F. Each of the shackles 12 can be adapted to hold a poultry paw 14, such as a chicken paw. The shackles 12, for example, as shown in FIG. 1, can each be adapted to hold two poultry paws 14.

According to an embodiment, each shackle 12 may comprise a pair of first and second substantially upright members 11, 13. The shackles 12 may define a bottom width W1 between the first and second substantially upright members 11, 13 that is dimensioned to retain the paw 14 on the shackle 12 for conveyance. The shackles 12 may further define an upper width W2 between the first and second substantially upright members 11, 13 that is wider than the width W1 and will release the paw 14 from the shackle 12, for example, after the paw 14 travels upward in the shackle 12. Although the shackle 12 is shown as having a pair of substantially upright members 11, 13, alternative embodiments may have only a single substantially upright member, or more than one pair of substantially upright members. The shackles 12 may be coupled to the conveyor 10 using a pivoting attachment that allows the shackle 10 to swing in a direction substantially perpendicular to the conveying direction F (e.g., in and out of the page in FIG. 1). One of ordinary skill in the art will appreciate from this description that the poultry shackles 12 are not limited to the embodiment shown and that other configurations are possible. One of ordinary skill in the art will also appreciate from this description that the shackles 12 are not restricted to use with poultry paws, or poultry, and that the components and steps described herein can be used for conveying, accepting, and/or rejecting other types of food products.

According to an embodiment, a detection device 16 may be positioned along the conveyor 10 to count the number of shackles 12 moving along the conveyor 10. The detection device may further be adapted to keep track of the numerical order of each poultry shackle 12 conveyed. The detection device 16 may be, for example, a photoelectric sensor, also called a photoeye, adapted to detect the location, absence, and/or presence of a poultry shackle 12 by using, for example, a light transmitter 15 and a photoelectric receiver 17. The detection device 16 may be used to identify and track the position of a poultry shackle $12^x$ holding a contaminated poultry paw $14^x$ along the conveyor 10. Such a poultry shackle $12^x$ holding a contaminated poultry paw $14^x$ may have been flagged upstream by the USDA, or similar governmental agency or quality assurance entity. The detection device 16 may identify and register a USDA flag associated with a particular shackle $12^x$. One of ordinary skill in the art will appreciate from this disclosure that other types of detection devices 16 besides a photoeye are possible, such as, for example, a magnetic sensor or a hall effect sensor.

According to an embodiment, the detection device 16 may include a plurality of photoeyes that are each positioned at different locations along the conveyor 10. For example, the photoeyes may be positioned, for example, approximately six inches apart, or between six and 12 inches apart. The plurality of photoeyes may be adapted to track the location of one or more contaminated poultry paws $14^x$, located on corresponding shackles $12^x$ identified for removal. Each shackle $12^x$ for removal may be identified by the detection device 16 by its numerical order on the conveyor 10.

Figure 2:
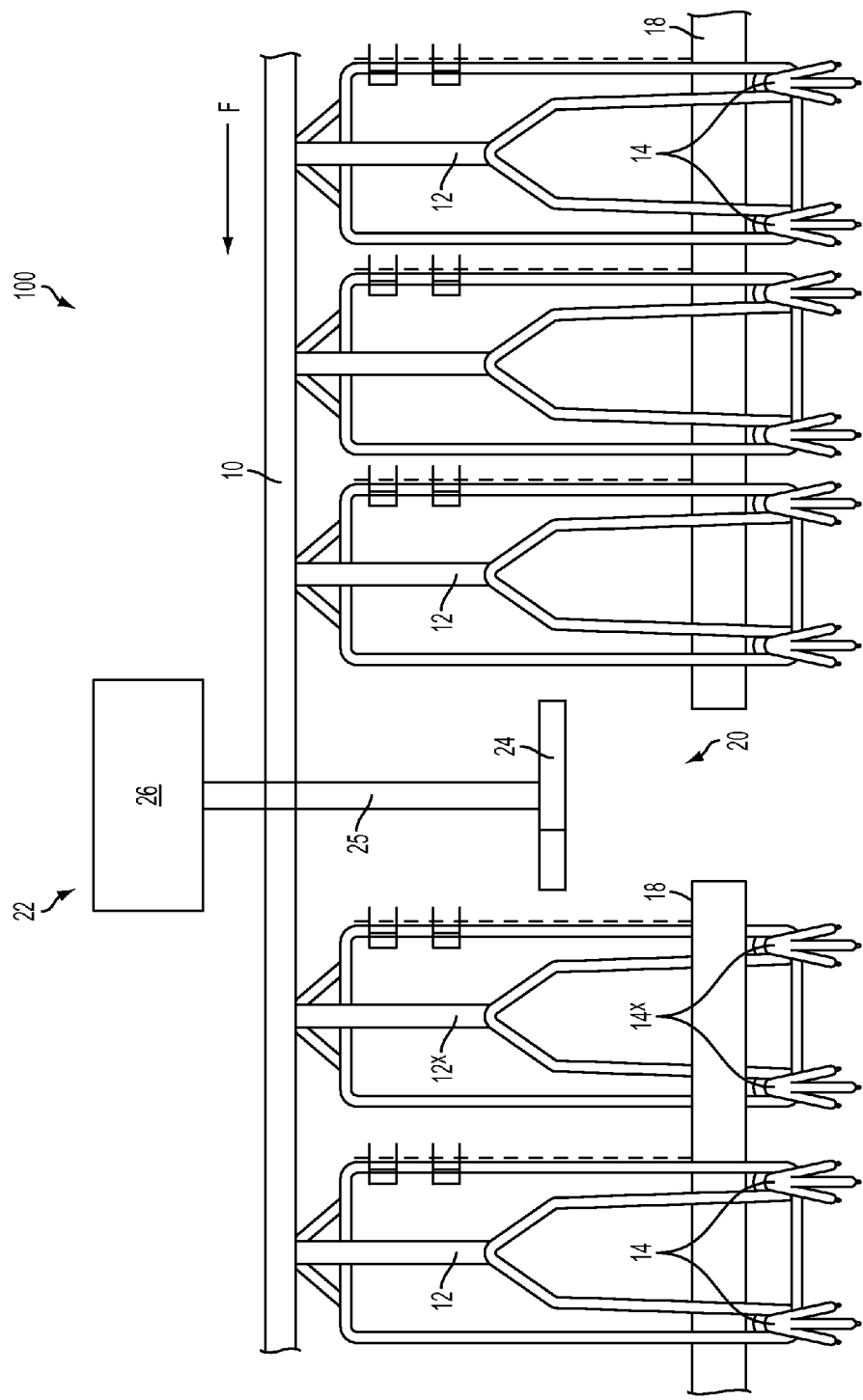
FIG. 2 depicts a second front view of the poultry processing line positioned downstream of the view depicted in FIG. 1.

FIG. 2 depicts a front view of the poultry processing line 100 downstream of the view shown in FIG. 1. A guide bar 18 having an entrance 20 may be positioned along the conveyor 10. The entrance 20 may be, for example, but not limited to, about 8 to 10 inches wide. The guide bar 18 may be adapted to redirect a specifically identified shackle $12^x$ from the processing line 100 to a disposal line 200 (shown in FIG. 3). The processing line 100 may be adapted to further process the saleable poultry paws 14, whereas the disposal line may be adapted to dispose of the identified contaminated poultry paws $14^x$.

According to an embodiment, a pushing device 22 may be positioned along the conveyor 10 and proximate to the entrance 20, for example, in registry with the entrance. The pushing device 22 may be adapted to push a shackle $12^x$, identified for removal, through the entrance 20 and onto the opposite side of the guide bar 18. The opposite side of the guide bar 18 may be associated with a guidance bar 30 that may feed into a backup unloader 32 (see FIG. 3). Progressive radius cam 24 can move shackle $12^x$ from conveyor 10 to guidebar 30. Conveyor 10 continues to move shackle $12^x$ through the guidance system to bypass the entrance into the paw cutter 400.

Figure 3:
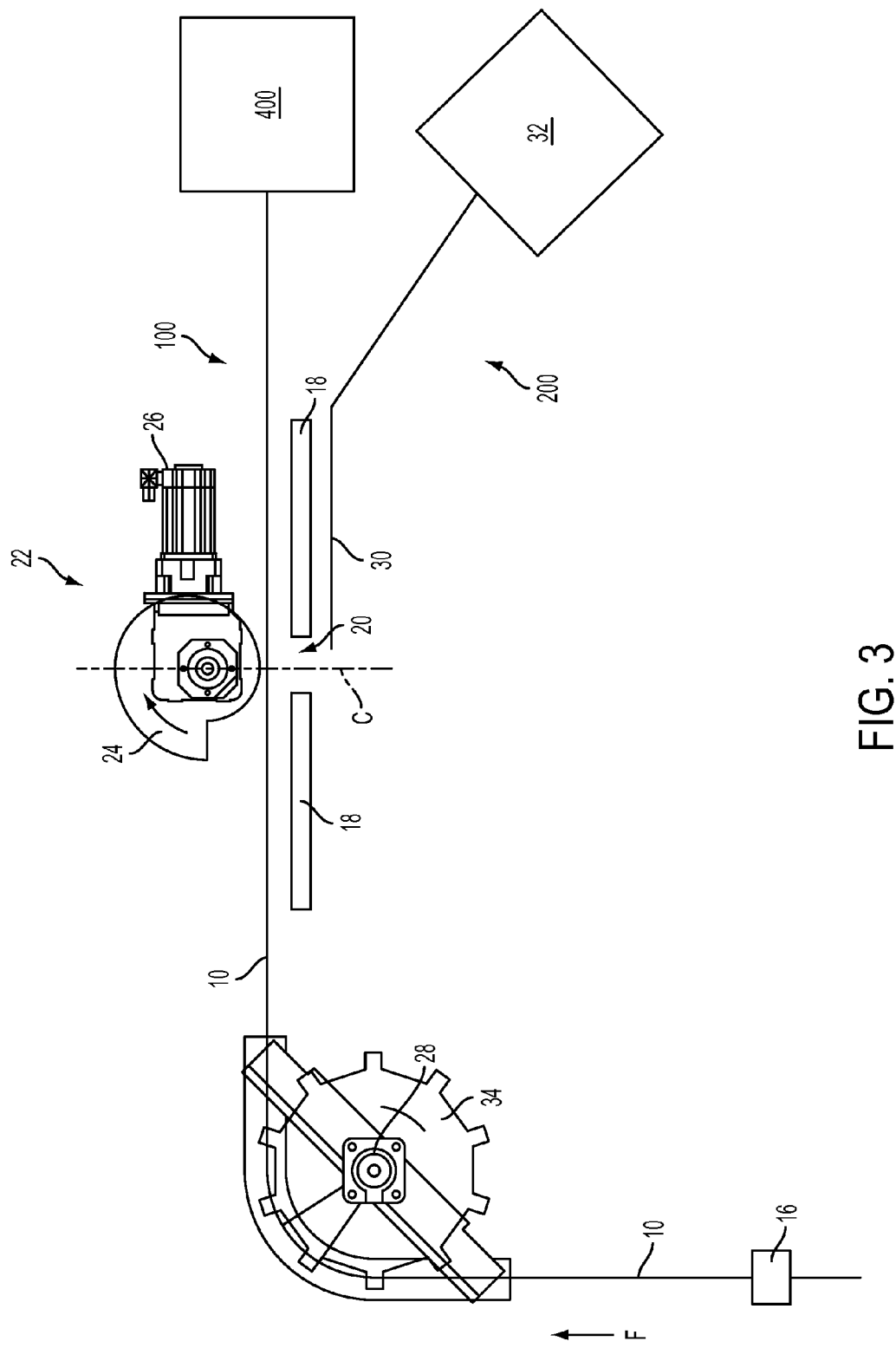
FIG. 3 depicts a top schematic view of the poultry processing line and the disposal line, according to an embodiment of the present invention.

FIG. 3 depicts a schematic top view of the poultry processing line 100 and disposal line 200, according to an embodiment of the invention. As shown, the detection device 16 may be positioned at a distance upstream of the entrance 20 of the guide bar 18 to identify a shackle $12^x$ to be removed. An encoder 28 may be positioned between the detection device 16 and the entrance 20. The encoder 28 may be attached to the shaft of a sprocket 34, also called a starwheel or other device, which may rotate or move in coordination with the conveyor 10. The sprocket 34 may be a 10-tooth gear input that may receive movement from the conveyor 10. The output of the sprocket 34 may rotate the shaft attached to the encoder 28. The encoder 28 may be adapted to track a position of the shackle $12^x$ to be removed along the conveyor 10 based on the rotation of the shaft (not shown). This transmission may mechanically and electrically convert rotation of the sprocket 34 into movement of the actual conveyor 10 to identify a position of the shackle 12.

In an embodiment, the encoder 28 may receive a signal from the detection device 16 identifying the location of a shackle $12^x$ to be removed along the conveyor 10. The encoder 28 may convert the number of rotations of the sprocket 34 into the distance the shackle $12^x$ has traveled in the forward and/or backward direction. This conversion may be based, for example, on the length of the conveyor 10 between the detection device 16 and the entrance 20, and/or the length of the circumference of the sprocket 34. Based on this conversion, the encoder 28 may track the position of shackle $12^x$ between the upstream detection device 16 and the downstream entrance 20. In an embodiment, the distance between the detection device 16 and the entrance 20 may be fixed.

Figure 4A:
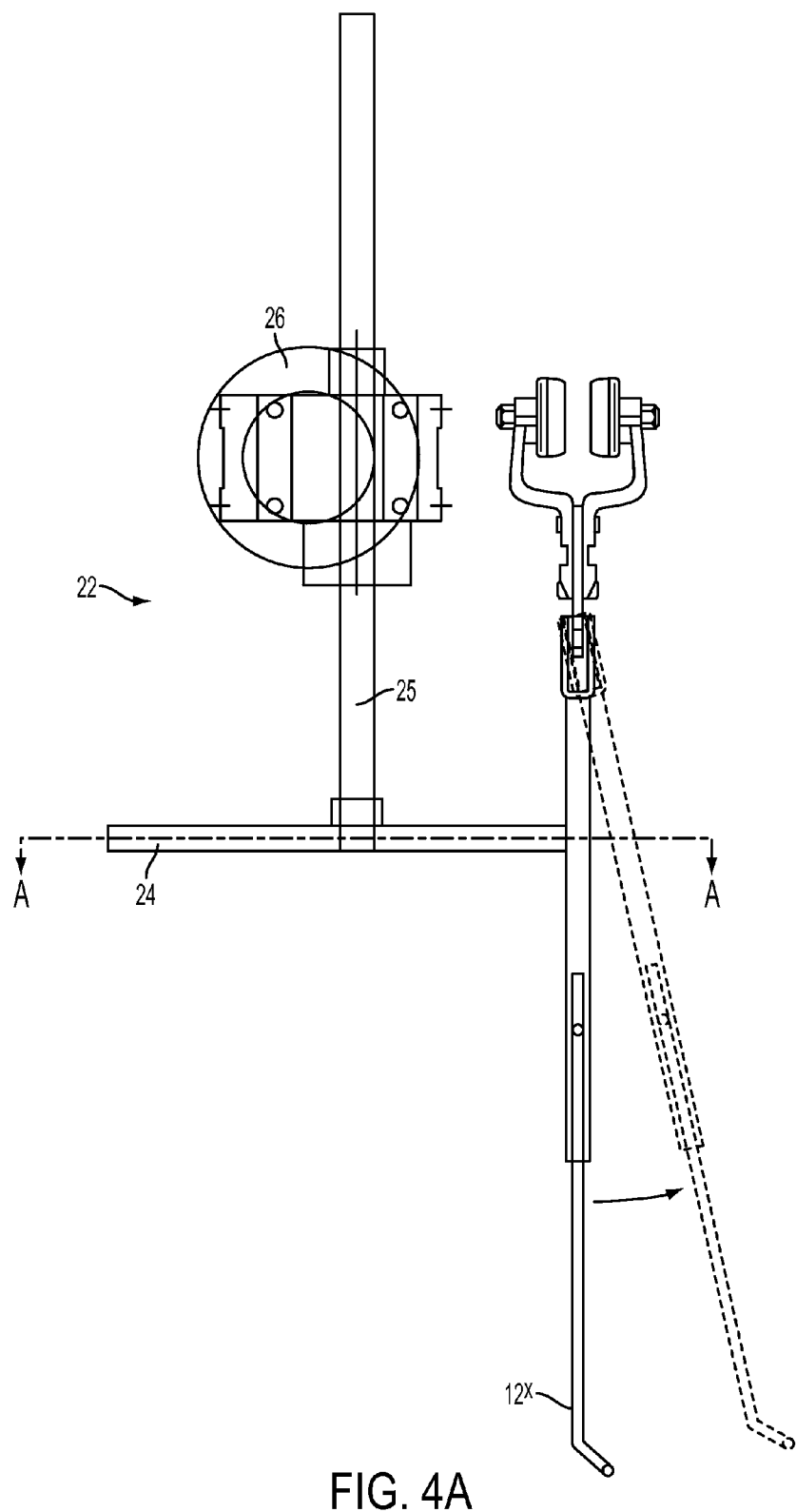
FIG. 4A depicts a side view of a pushing device, according to an embodiment of the present invention.

As shown in FIGS. 2, 3 and 4A, the pushing device 22 may comprise a cam 24 and a servomotor 26. The cam 24 may be rotatable around a shaft 25 connected to the servomotor 26. The servomotor 26 may be in electrical connection with the encoder 28 for control of the cam rotation. The encoder 28 may be adapted to signal the servomotor 26 when the shackle $12^x$ to be removed is aligned with the entrance, for example, when it reaches the center of rotation C of the cam 24.

Figure 4B:
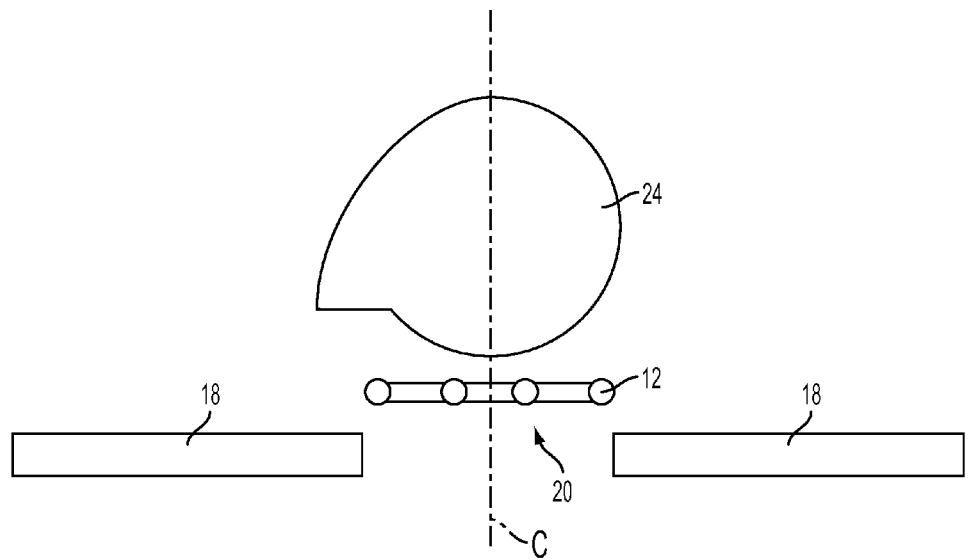
FIG. 4B depicts a cross-sectional view of the pushing device of FIG. 4A, taken along line A-A of FIG. 4A.

The cam 24 may allow a shackle 12 to pass along the poultry processing line 100, or may push, kick or knock a shackle $12^x$ with a condemned poultry paw $14^x$ away from the poultry processing line 100, through the entrance 20 to the opposite side of the guide bar 18, and into the disposal line 200. For example, FIG. 4B shows the cam 24 in a home position to allow the shackle 12 to pass by the entrance 20 of the guide bar 18 to continue along the poultry processing line 100 towards a downstream poultry processing station or apparatus, such as a paw cutting apparatus 400 (shown in FIGS. 3 and 9).

Figure 4C:
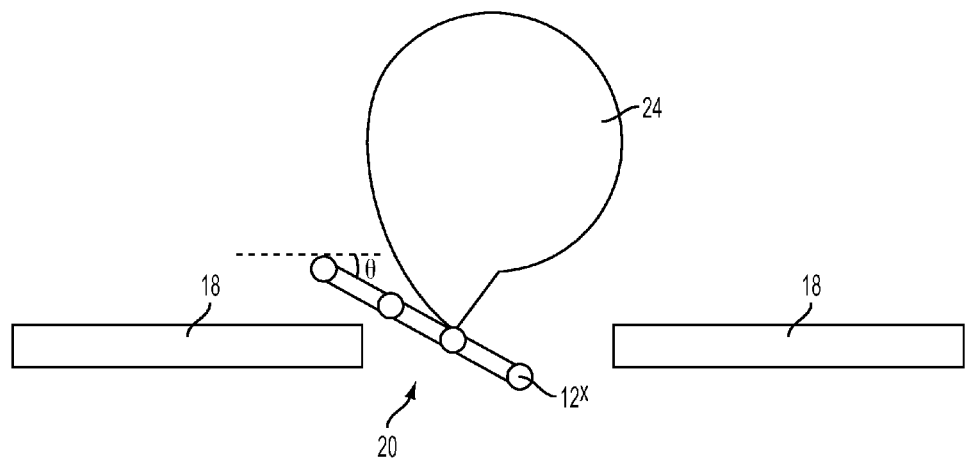
FIG. 4C depicts an alternative cross-sectional view of the pushing device of FIG. 4A, taken along line A-A of FIG. 4A.

In contrast, FIG. 4C shows the cam 24 in a rotated position after receiving confirmation from the encoder 28 that the shackle $12^x$ to be removed is positioned in registry with the entrance 20 of the guide bars 18 along centerline C. In this embodiment, the cam 24 may rotate and push the shackle $12^x$ to be removed at an increasing pressure angle $\ominus$ toward the entrance 20, for example, as the shackle $12^x$ on the conveyor 10 passes centerline C. After being pushed through the entrance 20 and to the opposite side of the guide bar 18, the shackle $12^x$ may transfer to a guidebar 30 of a disposal line 200 to bypass the processing station and convey towards a downstream disposal location, such as a backup unloader 32 (shown in FIG. 3). The transfer of the shackle $12^x$ may be accomplished via a sprocket (not shown) which is adapted to pick up the shackle $12^x$ after passing through the entrance 20, however other configurations are possible. The paws $14^x$ may be removed from the shackle $12^x$ and disposed of at the backup unloader 32. This process helps ensure that all paws 14 that continue along the poultry processing line 100 are good for sale and helps eliminate throwing good paws 14 away.

According to an embodiment, the cam 24 may be adapted to redirect two or more shackles $12^x$ to be removed consecutively. Based on the signal from the encoder 28, the servomotor 26 may control whether the cam redirects one shackle $12^x$ with a complete rotation or multiple shackles $12^x$ with a partial rotation.

Figure 5:
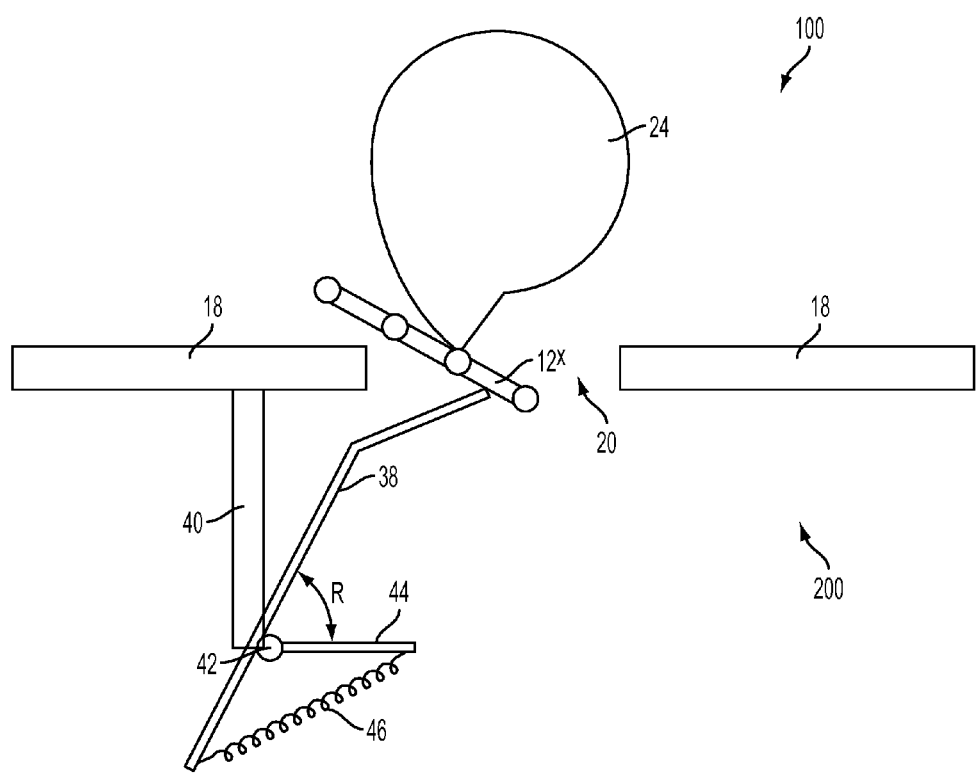
FIG. 5 depicts a cross-sectional view of the pushing device of FIG. 4A, taken along line A-A of FIG. 4A, according to a different embodiment of the present invention.

As shown in FIG. 5, a biased guide rod 38 may further assist the transfer of the shackle $12^x$ from the poultry production line 100 to the disposal line 200. In an embodiment, the guide rod 38 may be rotatably attached to the guide bar 18. An extended support portion 40 may project substantially perpendicular, or at an angle, from the guide bar 18. A pivot 42 may be attached to the extended support portion 40, and a bar element 44 may extend from the pivot 42. One end of the biased guide rod 38 may extend partially into the entrance 20 of the guide bar 18. The opposite end of the guide rod 38 may be attached via a spring 46 to the free end of the bar element 44. One of ordinary skill in the art will appreciate from this description that other embodiments of a biased guide rod are possible.

As the cam 24 rotates to push the shackle $12^x$ through the entrance 20, the shackle $12^x$ may contact the end of the guide rod 38, causing the spring 46 of the guide rod 38 to tension. This tensioning may result in a controlled movement of the shackle $12^x$ though the entrance 20, where the shackle $12^x$ may be pressed between the cam 24 and the guide rod 38. The guide rod may rotate with the shackle $12^x$ in the direction R. The spring-loaded tension of the guide rod 38 may prevent the shackle $12^x$ from reverting or kicking back through the entrance 20 after being pushed by the cam 24. The guide rod 38 may also slow down the speed of the shackle $12^x$ after being initially contacted by the cam 24. This may ensure safe passage of the shackle $12^x$, and thus the contaminated paws $14^x$, from the poultry processing line 100 to the disposal line 200. The guide rod 38 may release the shackle $12^x$ once the shackle $12^x$ is secured on the guidebar 30, or after the shackle $12^x$ has passed through the entrance 20.

Figure 6:
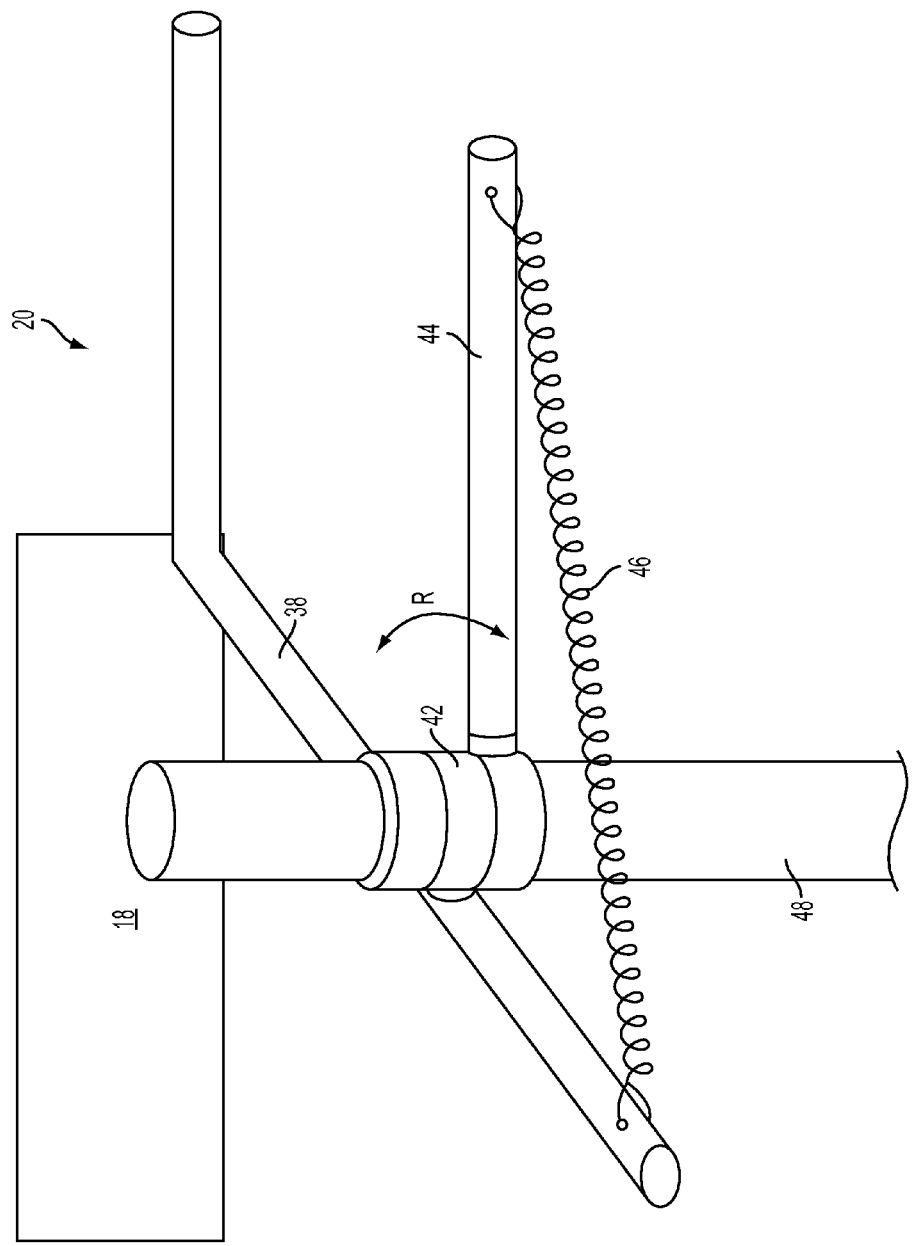
FIG. 6 depicts a side perspective view of the guide rod, according to an embodiment of the present invention.

According to the front perspective view shown in FIG. 6, the guide rod 38 need not be connected to the guide bar 18. In this embodiment, a substantially vertical support pole 48 may extend adjacent to the guide bar 18. Both the rotating pivot 42 and the stationary bar element 44 may be coupled directly to the pole 48. A center portion of the guide rod 38 may be fixed to the pivot 42 for rotational purposes.

Figure 7:
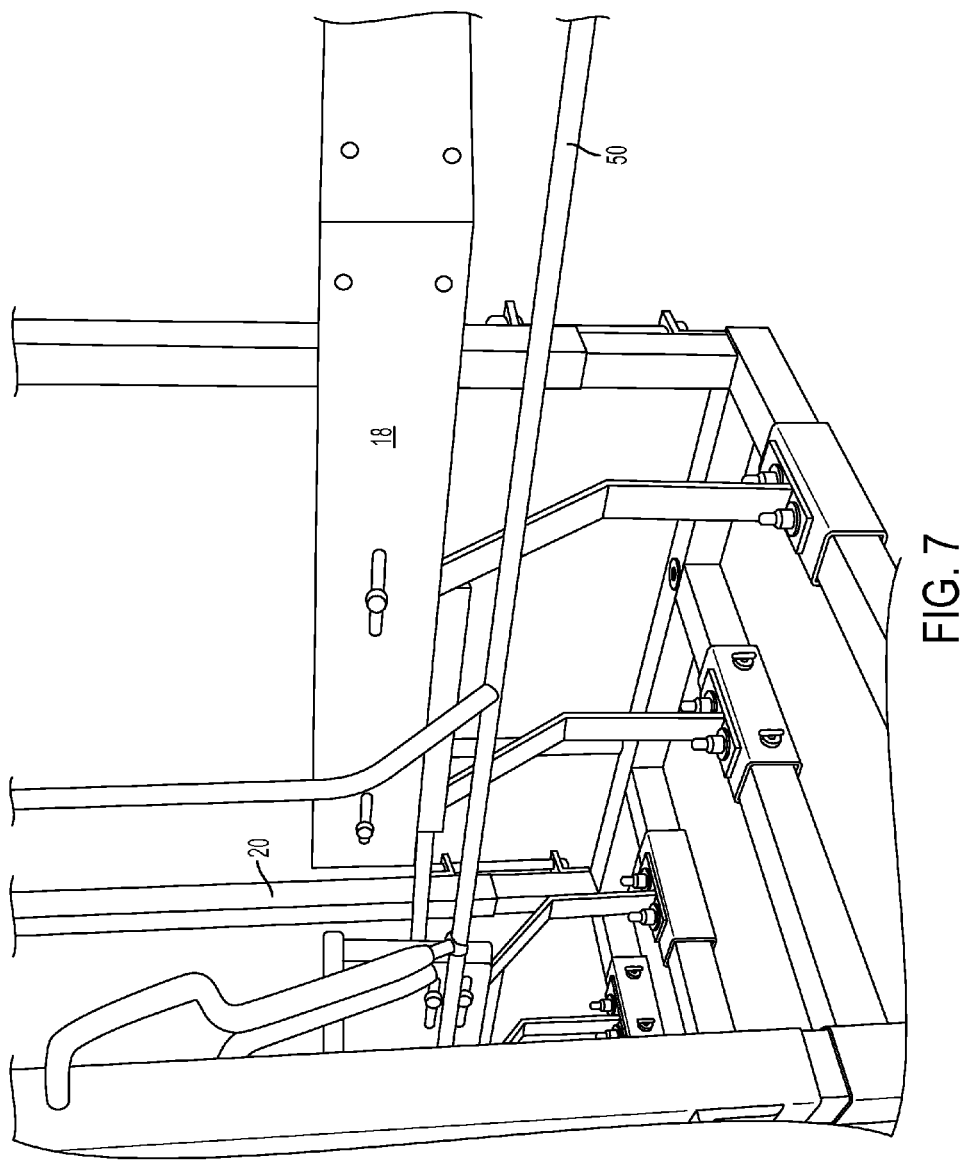
FIG. 7 depicts a front perspective view of the poultry processing line with a guide restraint, according to an embodiment of the present invention.

According to another embodiment, and as shown in FIG. 7, a guide restraint 50 may be positioned along the conveyor 10 of the poultry production line 100, the guidebar 30 of the disposal line 200, and/or either side of the guide bar 18. The guide restraint 50 may be tension loaded and may control the shackles 12 as they convey along the length of the conveyor 10 or guidebar 30. The guide restraint 50 may comprise a UHMW guide bar. For example, the guide restraint 50 may comprise a horizontal bar that extends at a close distance and substantially parallel to the conveyor 10 or guidebar 30 to prevent the shackles 12, $12^x$ from swinging away from the conveyor 10 or guidebar 30 during forward or backward motion. The guide restraint 50 may hang substantially vertically from the conveyor 10 and may be adjusted in height to contact the side of the shackles 12, $12^x$. The connection between the guide restraint 50 and the conveyor 10 or guidebar 30 may be a rotating or tensioning connection, so that the guide restraint 50 may rotate or tension slightly to lessen impact when contacting the shackles 12. This may prevent the poultry paws 14 from falling off the shackles 12. Alternatively, the guide restraint 50 may be supported by a structure separate from the conveyor 10 or guidebar 30. The guide restraint 50 may be positioned along the entire length of a conveyor 10 or guidebar 30 or along specific portions of the conveyor 10 or guidebar 30.

Figure 8:
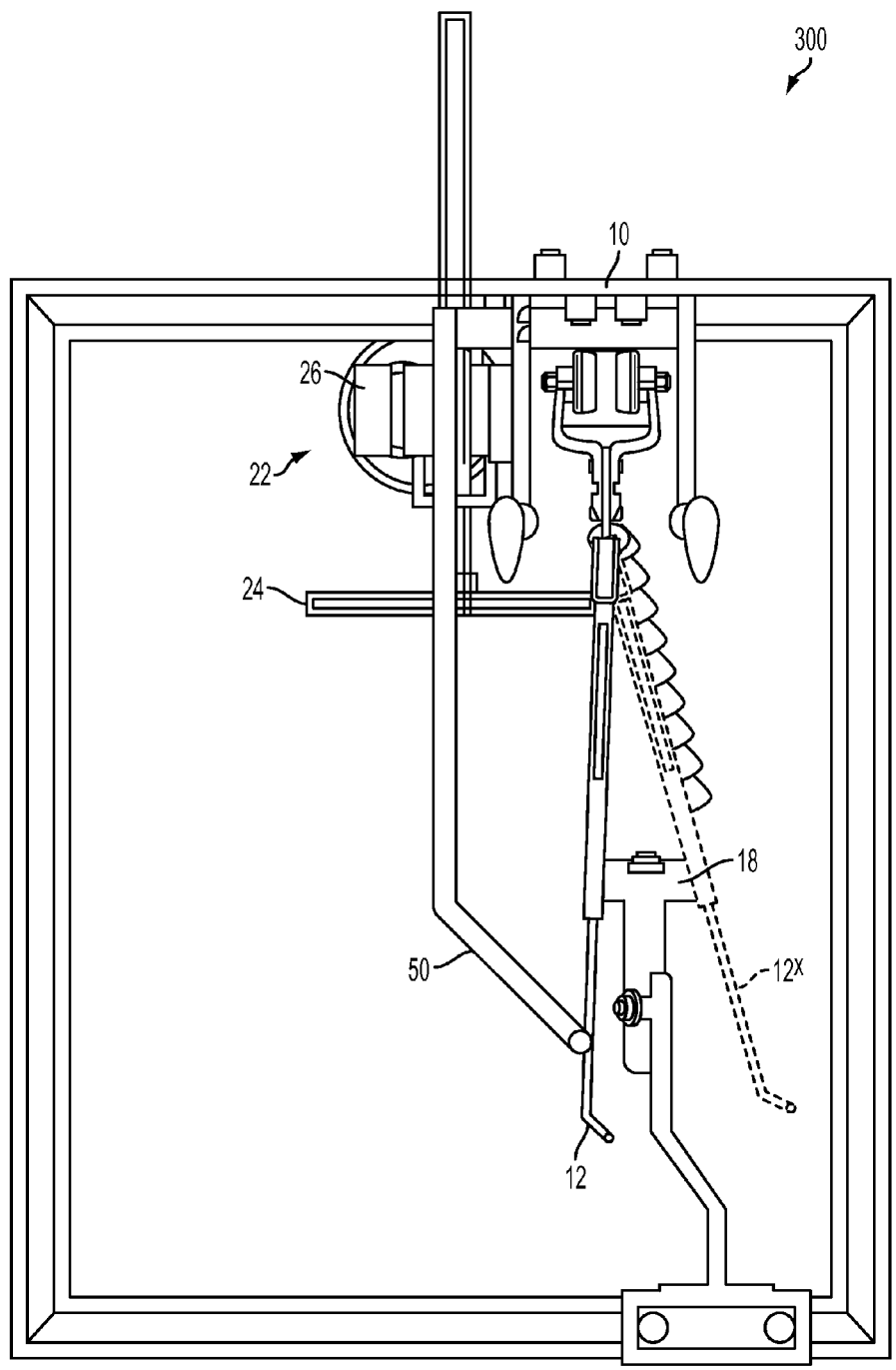
FIG. 8 depicts a side view of the poultry shackle redirecting apparatus, according to an embodiment of the present invention.

FIG. 8 depicts a side view of the poultry shackle redirecting apparatus 300, according to an embodiment of the present invention. In this figure, one shackle 12 is on one side of the guide bar 18 and will continue to move along conveyor 10 of the poultry processing line 100. Another shackle $12^x$ is on the opposite side of the guide bar 18 and will be diverted to guidebar 30 of the disposal line 200. The guide restraint 50 may be in contact with the shackle 12 to ensure that shackle 12 conveys poultry paws 14 along conveyor 10 with a minimized amount of swinging, turbulence and/or disruption.

Figure 9:
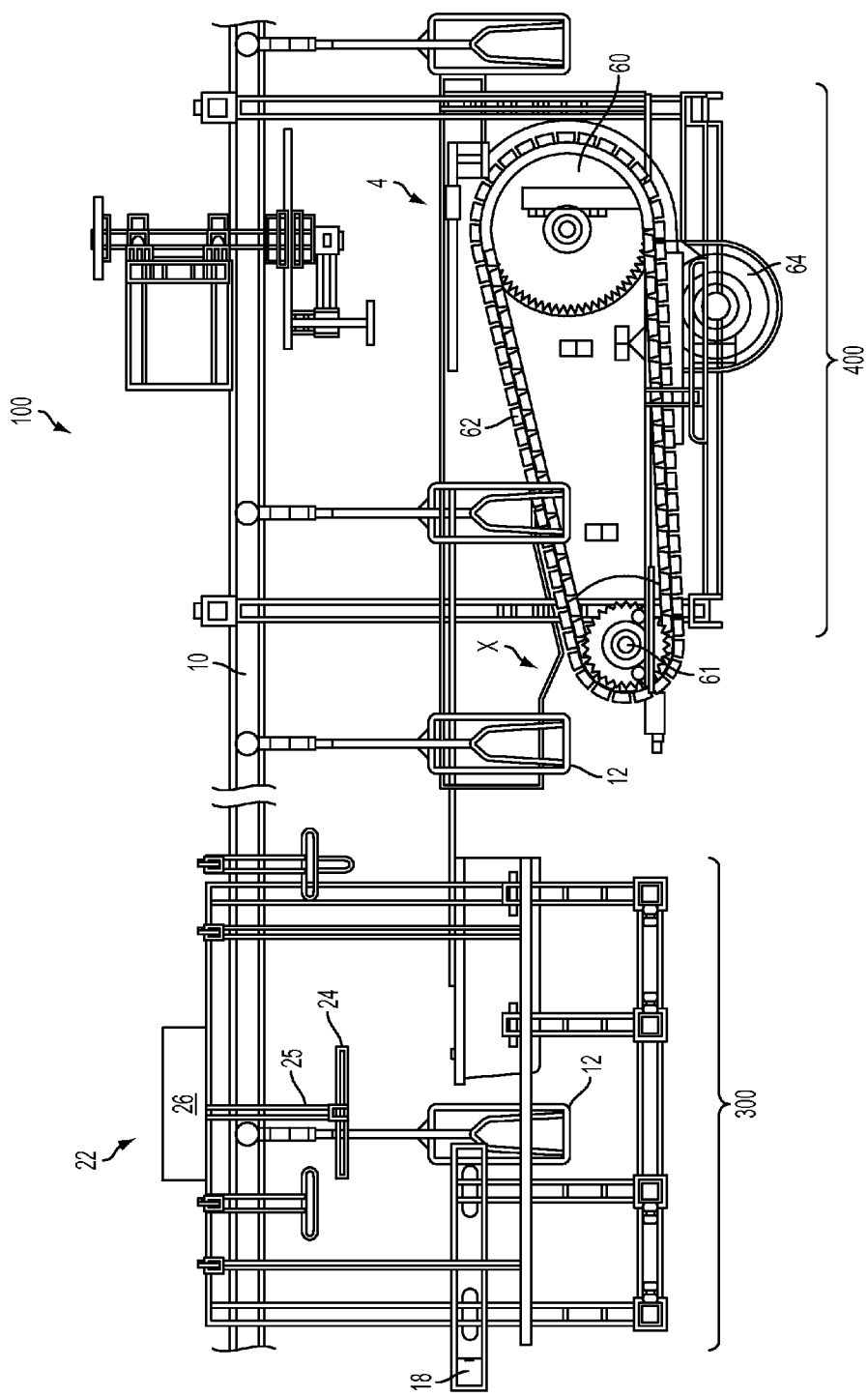
FIG. 9 depicts a front view of the poultry shackle redirecting apparatus in combination with a paw cutting apparatus, according to an embodiment of the present invention.

FIG. 9 depicts a front view of the poultry shackle redirecting apparatus 300 in combination with a paw cutting apparatus 400, according to an embodiment of the present invention. The poultry shackle redirecting apparatus 300 is upstream of the paw cutting apparatus 400 and prevents contaminated poultry paws $14^x$ from being cut by the paw cutting apparatus 400 and entering into the saleable product stream.

According to an embodiment, the poultry paw cutting apparatus 400 can include a chain 62, a first sprocket 61, and a second sprocket 60 located downstream from the first sprocket 61. The first sprocket 61 and/or the second sprocket 60 may rotate the chain 62. The chain 62 may receive the poultry paws 14 from the shackles 12 at a first location X, and may convey the poultry paws 14 substantially in unison with the shackles 12 to a second location Y. The shackles 12 can release the poultry paws 14 to the chain 62 at the second location Y.

A paw cutting station 64 may be positioned along the chain 62 between the first sprocket 61 and the second sprocket 60. According to an embodiment, a bird leg may include a shank portion and a paw portion. The cutting station 64 may remove the paw portion from the shank portion (not shown) of the bird's leg. The cutting station 64 may alternatively be adapted to remove other portions of the bird leg or bird. Additional details of the paw cutting apparatus can be found in applicant's U.S. Pat. No. 8,202,143 issued on Jun. 19, 2012, the entire content of which is incorporated by reference. One of ordinary skill in the art will appreciate from this disclosure that other types of processing devices besides the paw cutting apparatus 400 are possible.

According to an embodiment, and as shown in FIG. 3, a method for directing poultry shackles $12^x$ from a poultry processing line 100 to a disposal line 200, may include the steps of: 1) identifying, using a detection device 16, a shackle $12^x$ to be removed from a plurality of shackles 12 conveyed along a conveyor 10; 2) tracking movement of the shackle $12^x$ to be removed away from the detection device 16 and towards an entrance 20 of a guide bar 18 using an encoder 28 that is moved, rotated, or otherwise operated in coordination with the movement of the conveyor 10; 3) pushing the shackle $12^x$ to be removed away from the conveyor 10 and through the entrance 20 of the guide bar 18; and 4) separately conveying the shackle $12^x$ to be removed along the disposal line 200 to a downstream disposal location.

According to an embodiment, the shackle $12^x$ to be removed may be pushed using a pushing device 22 that is positioned along the conveyor 10 and in proximity to the entrance 20, for example, in registry with the entrance. The pushing device 22 may, for example, comprise a servomotor 26 and a cam 24, however, other configuration are possible. The encoder 28 may be electrically connected to the servomotor 26 and may be adapted to automatically align the cam 24 with the position of the shackle $12^x$ to be removed on the conveyor 10. As shown in FIG. 4C, the cam 24 may be adapted to rotate and push the shackle $12^x$ to be removed at an increasing pressure angle ⊖ towards the entrance 20 as the conveyor 10 passes a center of rotation C of the cam 24. Steadily increasing the pressure angle ⊖ may allow the cam 24 to retain contact, as well as control, of the shackle $12^x$ during movement towards the entrance 20.

As shown in FIG. 5, the method may include the step of preventing the shackle $12^x$ to be removed from reverting back through the entrance 20 after being pushed away from the conveyor 10, for example, using a biased guide rod 38.

According to an embodiment, the step of identifying a shackle $12^x$ to be removed may include counting the number of shackles 12 moving along the conveyor 10 using a sensor or photosensor, such as photoeye 16, to determine the position of a shackle $12^x$ to be removed, and/or relaying the position of the shackle $12^x$ to be removed to the encoder 28. The distance between the detection device 16 and the entrance 20 may be equivalent to a pre-determined number of rotations of the encoder 28. The encoder 28 may be adapted to track a position of the shackle $12^x$ to be removed regardless of whether the conveyor 10 is conveying the shackles 12 in a forward or a backward direction.

According to an embodiment, a controller or multiple controllers, for example, a programmable logic controller (PLC), may be used to coordinate and control operation of the various components of the redirecting apparatus 300. For example, according to an embodiment, the controller(s) may communicate with, control, and/or coordinate operation of at least the detection device(s) 16, the servo motor 26, and the encoder 28. Additionally or alternatively, the controller(s) may control one or both of the conveyor 10, guidebar 30 and/or the paw cutting apparatus 400. According to an embodiment, once the controller identifies a shackle $12^x$ to be removed and/or detects its position with detection device 16, the controller can track the location of the shackle $12^x$ via communication with the encoder 28, and may instruct the servo motor 26 to move the cam 24 when the shackle $12^x$ is in registry with the opening in the guide bar. One of ordinary skill in the art will appreciate from this description that more or less operations can be controlled and coordinated with the controller(s). One of ordinary skill will also appreciate from this description that other control schemes besides electronic controller can be used to operate the redirecting apparatus 300 and associated equipment.

As shown in FIG. 9, the method may include conveying the remaining shackles 12 on the poultry processing line 100 to a downstream poultry paw cutting apparatus 400. Based on the apparatus and method described above, all of the poultry paws 14 that reach the poultry paw cutting apparatus 400 should not be contaminated and should be safe for consumption. Contaminated paws $14^x$ under this system are likely identified and redirected from the poultry processing line 100 prior to reaching the poultry paw cutting apparatus 400.

The present invention may automatically redirect a single shackle from a poultry processing line to a disposal line, upon the identification of a contaminated paw. As such, the present invention may obviate the need to condemn several sets of poultry paws for each identified set of contaminated poultry paws. The present apparatus and method may also allow the shackles conveyed along the poultry processing and disposal lines to be accurately controlled and monitored from start to finish. Thus, the present apparatus and method may reduce waste produced by the more precise identification of contaminated poultry paws, because fewer poultry paws may need to be disposed of once a contaminated poultry paw has been identified. The present apparatus and method may further increase the efficiency of poultry paw processing, and ensure that only safe product enters the marketplace.

While various embodiments of the present invention have been described above, it should be understood that they have been presented by way of example only, and not limitation. Thus, the breadth and scope of the present invention should not be limited by any of the above-described embodiments, but should instead be defined only in accordance with the following claims and their equivalents.

What is claimed:

1. A poultry shackle redirecting apparatus, comprising:
a conveyor that conveys a plurality of poultry shackles;
a guide bar having an entrance positioned along the conveyor, wherein the guide bar is adapted to redirect a shackle from a processing line to a disposal line;
a detection device positioned at a distance upstream of the entrance to identify a shackle to be removed;
an encoder positioned between the detection device and the entrance, wherein the encoder moves in coordination with the movement of the conveyor and tracks a position of the shackle to be removed along the conveyor;
a pushing device, positioned along the conveyor and in proximity with the entrance, wherein, upon receiving instructions from the encoder that the shackle to be removed is positioned in registry with the entrance, the pushing device is adapted to push the shackle to be removed into the entrance of the guide bar.

2. The poultry shackle redirecting apparatus of claim 1, wherein each of the shackles is adapted to hold a poultry paw.

3. The poultry shackle redirecting apparatus of claim 1, wherein the pushing device comprises a cam.

4. The poultry shackle redirecting apparatus of claim 3, further comprising a servomotor adapted to rotate the cam about an axis of rotation, wherein the cam is adapted to rotate and push the shackle to be removed at an increasing angle toward the entrance as the conveyor passes the axis of rotation.

5. The poultry shackle redirecting apparatus of claim 4, wherein the encoder is electrically connected to the servomotor and is adapted to automatically align the cam with the location of the shackle to be removed on the conveyor.

6. The poultry shackle redirecting apparatus of claim 1, wherein the entrance of the guide bar is approximately 8 to 10 inches wide.

7. The poultry shackle redirecting apparatus of claim 1, further comprising a biased guide rod that engages the shackle to be removed to tension the shackle against the cam while being pushed through the entrance of the guide bar.

8. The poultry shackle redirecting apparatus of claim 7, wherein the guide rod further comprises a substantially vertical element, a substantially horizontal bar element, a pivot and an elastic member, wherein the pivot is rotatably coupled to the substantially vertical element, the guide bar is fixed to the pivot, the substantially horizontal bar element is fixed to the substantially vertical element, and the elastic member connects the free ends of the guide bar and the substantially horizontal bar element.

9. The poultry shackle redirecting apparatus of claim 7, wherein the biased guide rod is moveable between a position that allows the shackle to move through the entrance from the processing line to the disposal line and a position that prevents the shackle from moving through the entrance from the disposal line to the processing line.

10. The poultry shackle redirecting apparatus of claim 7, wherein the disposal line comprises a guidance system that feeds into a backup unloader.

11. The poultry shackle redirecting apparatus of claim 10, wherein the biased guide rod releases the shackle to be removed once the shackle is secured on the guidance system.

12. The poultry shackle redirecting apparatus of claim 1, wherein the detection device comprises a photodetector that is adapted to count the number of shackles moving along the conveyor.

13. The poultry shackle redirecting apparatus of claim 12, wherein the photodetector is adapted to identify a shackle to be removed based on the numerical order of the shackle along the conveyor, and wherein the photodetector relays the position of each shackle to be removed to the encoder.

14. The poultry shackle redirecting apparatus of claim 1, wherein the detection device comprises a plurality of photo-eyes positioned at different locations upstream of the entrance on the conveyor, wherein the plurality of photoeyes are adapted to track the position of a shackle to be removed based on the numerical order of the shackle along the conveyor.

15. The poultry shackle redirecting apparatus of claim 1, wherein the distance between the detection device and the entrance is equivalent to a predetermined number of rotations of the encoder.

16. The poultry shackle redirecting apparatus of claim 1, wherein the encoder is adapted to track a position of the shackle to be removed regardless of whether the conveyor is conveying the shackle in a forward or backward direction.

17. The poultry shackle redirecting apparatus of claim 1, wherein the pushing device is positioned directly upstream of a poultry paw cutting apparatus.

18. A method for directing poultry shackles from a poultry processing line to a disposal line, comprising:
identifying, using a detection device, a shackle to be removed from a plurality of shackles conveyed along a conveyor;
tracking movement of the shackle to be removed away from the detection device and towards an entrance of a guide bar using an encoder that is moved in coordination with the movement of the conveyor;
pushing the shackle to be removed away from the conveyor and through the entrance of the guide bar; and
separately conveying the shackle to be removed along the disposal line to a downstream disposal location.

19. The method of claim 18, wherein the detection device is positioned at a distance upstream of the entrance of the guide bar, and wherein the guide bar is positioned along the conveyor.

20. The method of claim 18, wherein the shackle to be removed is pushed using a pushing device that is positioned along the conveyor and in proximity to the entrance.

21. The method of claim 20, wherein the pushing device comprises a servomotor and a cam, wherein the encoder is electrically connected to the servomotor and is adapted to automatically align the cam with the position of the shackle to be removed on the conveyor, and wherein the cam is adapted to rotate and push the shackle to be removed at an increasing pressure angle towards the entrance as the conveyor passes an axis of rotation of the cam.

22. The method of claim 18, wherein the entrance of the guide bar is approximately 8 to 10 inches wide.

23. The method of claim 18, further comprising preventing the shackle to be removed from reverting back through the entrance after being pushed away from the conveyor using a biased guide rod.

24. The method of claim 18, wherein the step of identifying a shackle to be removed comprises:
counting the number of shackles moving along the conveyor using a photodetector to determine the position of a shackle to be removed; and
relaying the position of the shackle to be removed to the encoder.

25. The method of claim 18, wherein the distance between the detection device and the entrance is equivalent to a predetermined number of rotations of the encoder.

26. The method of claim 18, wherein the encoder is adapted to track a position of the shackle to be removed regardless of whether the conveyor is conveying the shackles in a forward or a backward direction.

27. The method of claim 18, further comprising conveying the remaining shackles on the processing line to a downstream poultry paw cutting apparatus.

\* \* \* \* \*